United States Patent [19]
Mathewson

[11] Patent Number: 4,766,508
[45] Date of Patent: Aug. 23, 1988

[54] BURST INTEGRAL DETECTING EMBEDDED SERVO DISK TRACKING SYSTEM

[75] Inventor: Christopher W. Mathewson, Rochester, N.Y.

[73] Assignee: Eastman Kodak Company, Rochester, N.Y.

[21] Appl. No.: 914,703

[22] Filed: Oct. 2, 1986

[51] Int. Cl.$^4$ ............................................. G11B 5/596
[52] U.S. Cl. ........................................ 360/77; 360/78
[58] Field of Search .............................. 360/77, 78, 75

[56] References Cited

U.S. PATENT DOCUMENTS

| | | |
|---|---|---|
| 3,479,664 | 11/1969 | Stuart-Williams et al. .......... 360/77 |
| 3,534,344 | 10/1970 | Santana ............................ 340/174.1 |
| 3,691,543 | 9/1972 | Mueller ........................ 340/174.1 B |
| 3,742,470 | 6/1973 | Ha et al. ...................... 340/174.1 B |
| 3,893,180 | 7/1975 | Braun et al. ........................... 360/77 |
| 4,074,328 | 2/1978 | Hardwick ............................. 360/77 |
| 4,085,427 | 4/1978 | Dunn ..................................... 360/77 |
| 4,188,646 | 2/1980 | Sordello et al. ...................... 360/77 |
| 4,338,682 | 7/1982 | Hosaka et al. ....................... 369/44 |
| 4,380,033 | 4/1983 | Bacrania ............................... 360/77 |
| 4,472,750 | 9/1984 | Klumpp et al. ....................... 360/78 |
| 4,477,849 | 10/1984 | Berger .................................. 360/77 |
| 4,511,938 | 4/1985 | Betts ..................................... 360/77 |
| 4,578,723 | 3/1986 | Betts et al. ............................ 360/77 |
| 4,581,567 | 4/1986 | Yanagawa et al. ................... 360/75 |
| 4,586,094 | 4/1986 | Chambors et al. ................... 360/77 |
| 4,616,275 | 10/1986 | Peeters ................................. 360/77 |
| 4,646,175 | 2/1987 | Sokolik et al. ........................ 360/78 |
| 4,669,004 | 5/1987 | Moon et al. .......................... 360/77 |

Primary Examiner—Raymond F. Cardillo, Jr.
Assistant Examiner—David L. Robertson
Attorney, Agent, or Firm—Robert M. Wallace

[57] ABSTRACT

In a floppy disk drive, the head position is controlled in accordance with prerecorded sets of sinusoidal bursts recorded first on the right side of each track and then on the left side of each track in the narrow separation space between each pair of adjacent disk sectors. The serial bursts are peak detected and then integrated by the same peak detector and the same integrator, the integrals of the right and left bursts being substracted and transmitted to the head tracking servo as a position error signal. The process of peak detecting prior to integration removes the detected wave shape (which changes with track radius) as a factor in the position error computation, thus eliminating dependency of the error computation on the track radius. Using a single channel—the same peak detector and the same integrator—to process both the right and left hand sinusoid bursts eliminates offset errors in the tracking error computation characteristic of dual channel devices.

9 Claims, 4 Drawing Sheets

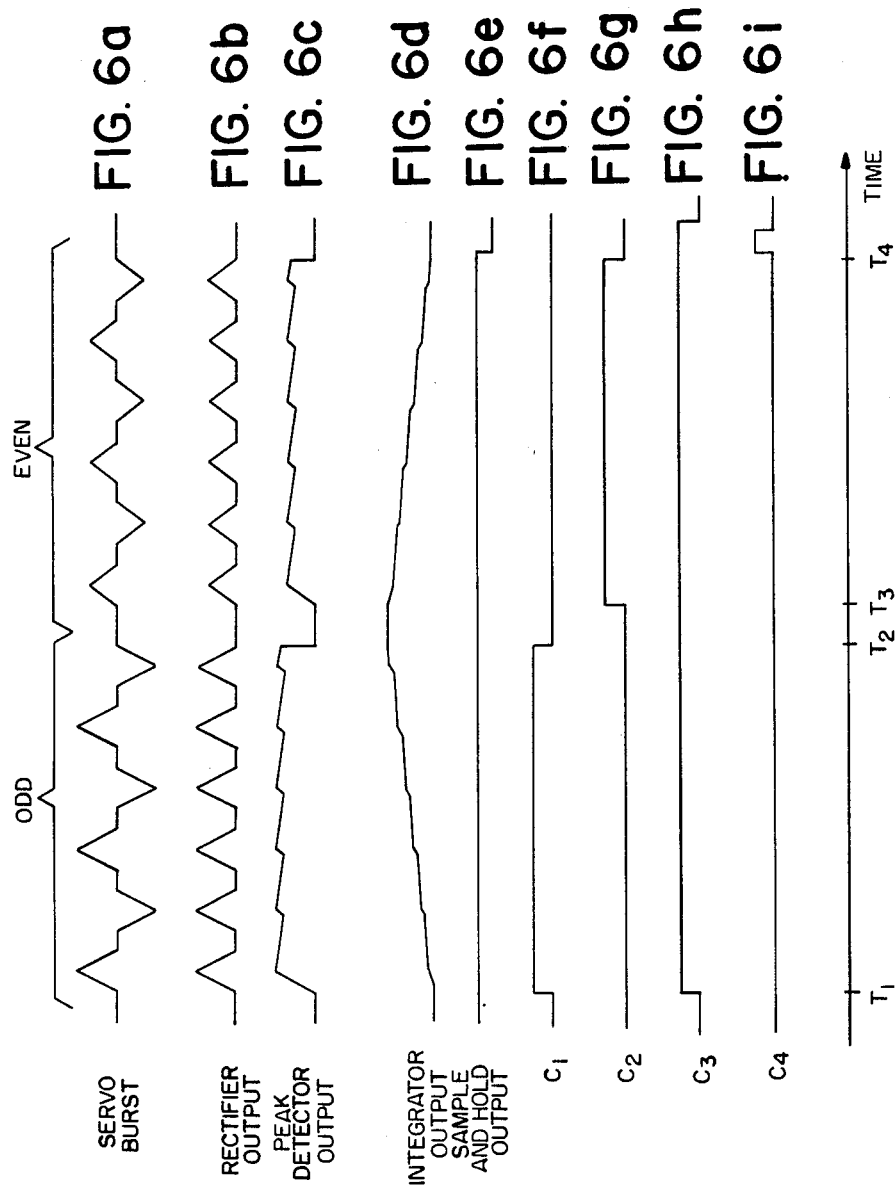

BURST INTEGRAL DETECTING EMBEDDED SERVO DISK TRACKING SYSTEM

BACKGROUND OF THE INVENTION

1. Technical Field

The invention is a head tracking controller for a floppy disk drive system in which the influence of track radius and the presence of offset error are both eliminated to provide a significantly more accurate head tracking control and a significant advance on the art.

2. Description of Related Art

A hard disk drive, such as the Winchester disk drive, typically includes a plurality of hard disks rigidly held together and rotated simultaneously by the disk drive and contacted by a corresponding plurality of read/write heads rigidly coupled together. One of the many disk surfaces is dedicated to prerecorded tracking signals. That head associated with the dedicated disk surface picks up the prerecorded tracking signals and sends them to a head servo, which uses these signals to control the radial position of all the heads. The purpose of the head servo is to keep all the heads in the center of the desired disk track.

3. Discussion related to the Problem

Floppy disk drives present more difficult tracking control problems, because the disks are not rigid and therefore cannot be rigidly joined together as a plurality of disks in which one of the disk surfaces is dedicated to generating constant tracking error signals. Thus, the head tracking control system for hard disk drives is not useful for floppy disks. Instead, each floppy disk must be operated separately and independently, with its own prerecorded tracking error signals sharing space with the recorded user data. Because the prerecorded tracking error signals must share space with the stored data, they are preferably limited to short bursts so that their processing is more critical than the processing of the constant tracking signal characteristic of a hard disk drive.

Tracking signals are typically prerecorded on both the right and left side of each disk track. The head picks up both the right and left signals, and the two are separated and subtracted from one another, to generate a head tracking position error signal. The presence of two (right and left) simultaneous tracking signals rquires two channels, or sets of circuits, to perform the separation and subtraction steps. The two parallel channels are characterized by an offset error between them (due to unavoidable component differences) and this offset error is unavoidably introduced into the error computation process.

The prerecorded tracking signal, as sensed by the head, has a diffferent waveform—and therefore a different energy content—at different disk radii or tracks. (This is because the bit density on the disk is inversely proportional to the track radius). As a result, using the prerecorded right-hand and left-hand tracking signals sensed by the head to compute head tracking position error produces different error signals at different disk radii for the same tracking error. Thus, there is a built-in radial bias error in the tracking control system.

In summary, floppy disk drives are characterized by limited space for prerecording tracking signal, a built-in offset error and a built-in radial bias error. In the prior art, these undesirable characteristics have remained an impediment to improving disk drive accuracy and therefore constitute a fundamental limitation.

SUMMARY OF THE INVENTION

Solution to the Problem

The foregoing limitation is overcome in the invention in which a tracking signal is prerecorded as a single burst adjacent the right side of a given track followed by a single burst adjacent the left side of the track, the two bursts occurring serially and confined together within a "border" region between two adjacent disk sectors. Preferably, the disk is divided into many sectors (e.g., 78 sectors), there being a thin pie-shaped border region between each sector, each track characterized by right and left tracking bursts prerecorded in serial order in each sector border region through which the disk track passes.

A peak detector first peak-detects the serial train of right and left tracking bursts picked up by the read/write head. An integrator then integrates the detected peaks of the right-hand burst and then integrates the detected peaks of the left-hand burst (in the order of occurrence), and subtracts the results of the two integrations. (In the preferred embodiment, the subtraction is performed simultaneously with the second integration step.) The resulting difference is transmitted as a head-tracking position error feedback signal to the head-tracking position servo.

Advantages of the Invention

Recording tracking signal bursts in every sector border region adjacent each side of every track facilitates frequent repetitions of tracking error computations without detracting from the space usually allocated to recording user data. Prerecording the right-hand tracking burst and then the left-hand tracking burst in serial order along each track, as opposed to simultaneously prerecording them in parallel, permits processing of both the right and left tracking bursts in a single (serial) channel. Use of a single channel (as opposed to two parallel channels) requires only one peak detector and only one integrator, and avoids the offset error characteristic of parallel channel processing. Peak detecting the tracking bursts sensed by the head prior to integration renders the integration process virtually insensitive to the waveform (energy content) of the detected tracking signals. Significantly, this eliminates any radial bias in the tracking position error computation. Integrating the detected tracking signal bursts eliminates various high-frequency noise.

In summary, the invention provides a revolutionary departure from the prior art by simultaneously eliminating radial bias and offset errors in a floppy disk drive tracking control system using a head tracking signal prerecorded in such a manner as to avoid detracting from user data space on the disk.

DESCRIPTION OF THE DRAWINGS

The invention may be understood by reference to the accompanying drawings of which:

FIG. 6(a through i) includes contemporaneous timing diagrams illustrating the operation of the apparatus of FIG. 5.

DETAILED DESCRIPTION

Figure 1A:
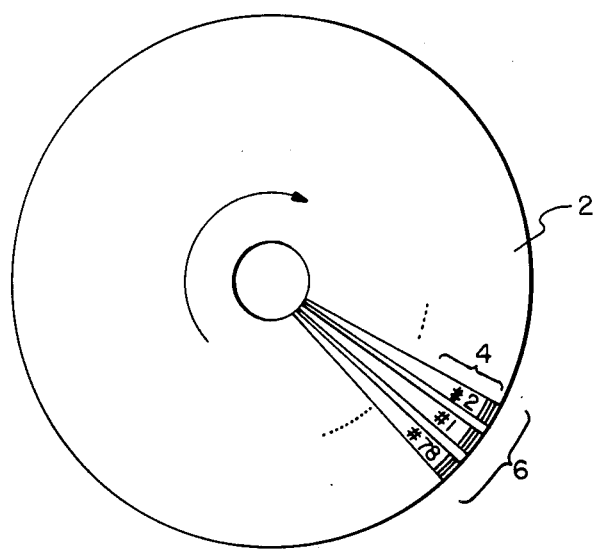
FIG. 1(a, b and c) illustrates prerecorded tracking signals on a disk according to the invention.
Figure 1B:
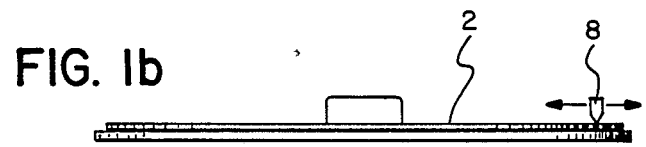
Figure 1C:
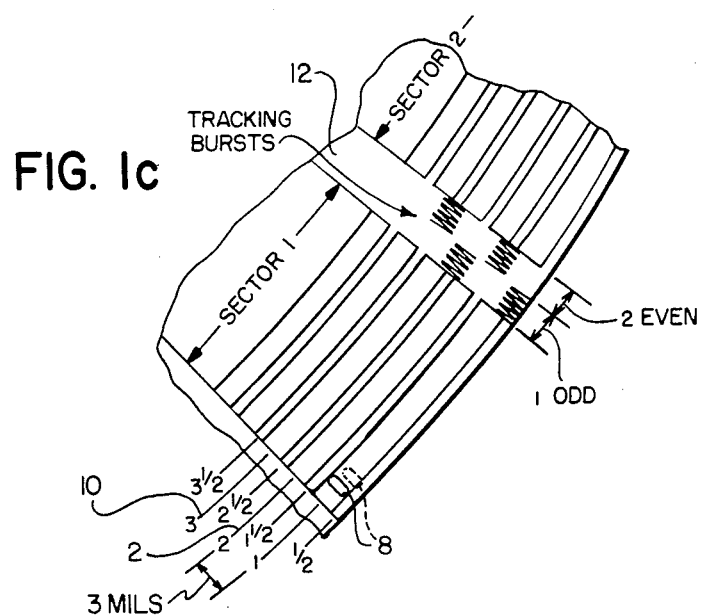

Referring to FIG. 1a, a floppy disk 2 includes a plurality of arcuate tracks 4 (including track numbers 1, 2, 3, etc.) divided into 78 pie-shaped sectors 6 (including sector numbers 1 through 78). The disk 2 is characterized by flexible material supporting a magnetic medium. Referring to FIG. 1b, a read/write head 8 may be positioned over any one of the tracks 4 in order to read or write data on the disk 2. FIG. 1c is an enlargement of a portion of FIG. 1a illustrating track numbers 1, 2 and 3. Each of the tracks is characterized by a longitudinal center line 10. Typical spacing between adjacent track center lines is about 3 mils. A thin pie-shaped sector interface ("border") region 12 separates adjacent sectors, such as sector numbers 1 and 2. The interface region 12 extends radially from the disk center to the outer circumference of the disk 2. Tracking signals are prerecorded in each of the sector interface regions 12.

Figure 2:
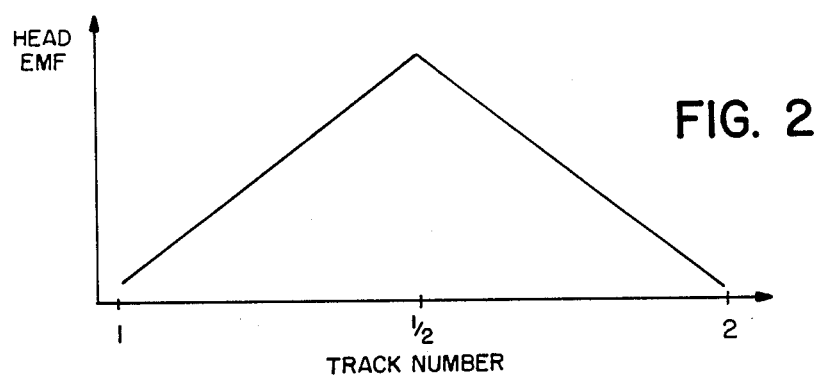
FIG. 2 illustrates the induced voltage in a read/write head as a function of head position.

As shown in FIG. 1, "odd" and "even" tracking bursts (each burst including a plurality of sinusoid-like peaks) are recorded in each sector interface region 12 at the center line positions corresponding to half track numbers $\frac{1}{2}$, $1\frac{1}{2}$, $2\frac{1}{2}$, $3\frac{1}{2}$, ... etc. between adjacent main tracks (numbers 1, 2, 3 ...) as shown in FIG. 1c. Referring to FIG. 2, the induced EMF voltage in the head 8 from the tracking bursts recorded along track number $\frac{1}{2}$ rises or falls linearly as the head moves toward or away from the position corresponding to the center line of track number $\frac{1}{2}$, for example.

Figure 3:
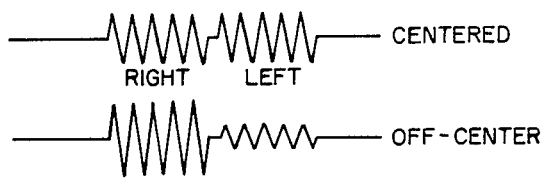
FIG. 3 includes comparative diagrams illustrating the output voltage of a read/write head for different head positions.

If it is desired to center the head 8 with respect to track number 1, a feedback position error signal may be obtained from the head itself by substracting the two signals picked up by the head 8 from the odd and even tracking bursts recorded at track numbers $\frac{1}{2}$ and $1\frac{1}{2}$ (i.e., the "right" and "left" sides of track 1), respectively. This technique is best illustrated in FIG. 3. In FIG. 3a, the odd and even tracking bursts induce "odd" and "even" ("right and "left") sinusoidal responses of equal magnitude in the head 8. (In the following discussion, the term "odd" and "even" is used instead of "right" and "left" when referring to the tracking burst pair adjacent each track in each sector interface region 12. It should be noted that for main track numbers 1, 3, 5, ... etc., the "right" tracking burst preceeds the "left" tracking burst, and vice-versa for the main track numbers 2, 4, 6, ... etc.) FIG. 3(top) corresponds to the solid line centered (correct) position of the head 8 illustrated in FIG. 1c. FIG. 3(bottom) corresponds to the off-center dashed-line position of the head 8 illustracted in FIG. 1c. In FIG. 3b, the odd burst (track $\frac{1}{2}$) induces a large signal while the even burst (track $1\frac{1}{2}$) induces a small signal in the head 8. The difference between the two induced signals is linearly proportional to the deviation of the head 8 from correct solid-line position of FIG. 1c.

Each pair of prerecorded odd and even tracking bursts is advantageously confined within the sector interface regions 12, so as not to take up space inside any of the sectors 6 where user data is to be recorded.

As the head 8 travels along track number 1 and crosses over the sector interface region 12, it first encounters the odd tracking burst recorded at track position $\frac{1}{2}$. At the conclusion of the odd tracking burst, it encounters the even tracking burst recorded at track position $1\frac{1}{2}$. Thus, the head 8 picks up and transmits the odd and even tracking bursts at different times, so that there is no need to separate the two bursts, and a single channel suffices to process them both (as opposed to two parallel channels), a significant advantage.

Figure 4A:
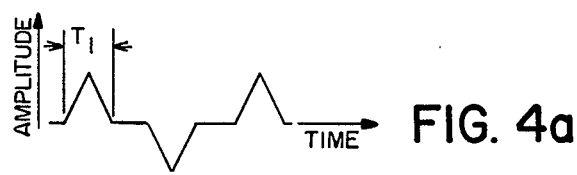
FIG. 4(a and b) includes comparative diagrams illustrating the sensed tracking signal for different of track radii.
Figure 4B:
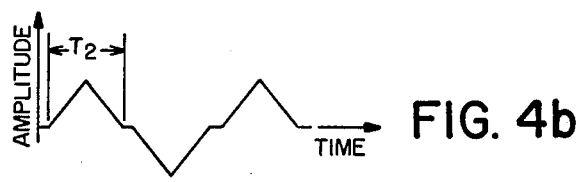

The time domain waveform of each tracking burst "spreads out" as the head progresses toward the center of the disk due to the increase in linear bit density with decreasing track radius. The tracking bursts recorded adjacent track number 1, for example, are characterized by the waveform of FIG. 4a and a pulse-width $T_1$. The same tracking bursts recorded adjacent track number 300, for example, (closer to the center of the disk 2) are characterized by the waveform of FIG. 4b and a longer pulse-width $T_2$. (This effect is confirmed in experimental data described herein in connection with a table given on the last page of this Detailed Description.) This difference introduces a significant radial bias into the head tracking position error computed by subtracting the right and left tracking bursts from one another, a significant problem.

This latter problem is overcome in the present invention by first detecting all the peaks of each pair of odd and even tracking bursts, and then integrating the detected peaks (instead of integrating the entire burst waveform). The integrals of the peaks of the odd and even tracking bursts, respectively, are subtracted from one another. This produces a head tracking position error signal which is virtually independent of the detected tracking burst waveform and of the radial position of the particular track.

Figure 5:
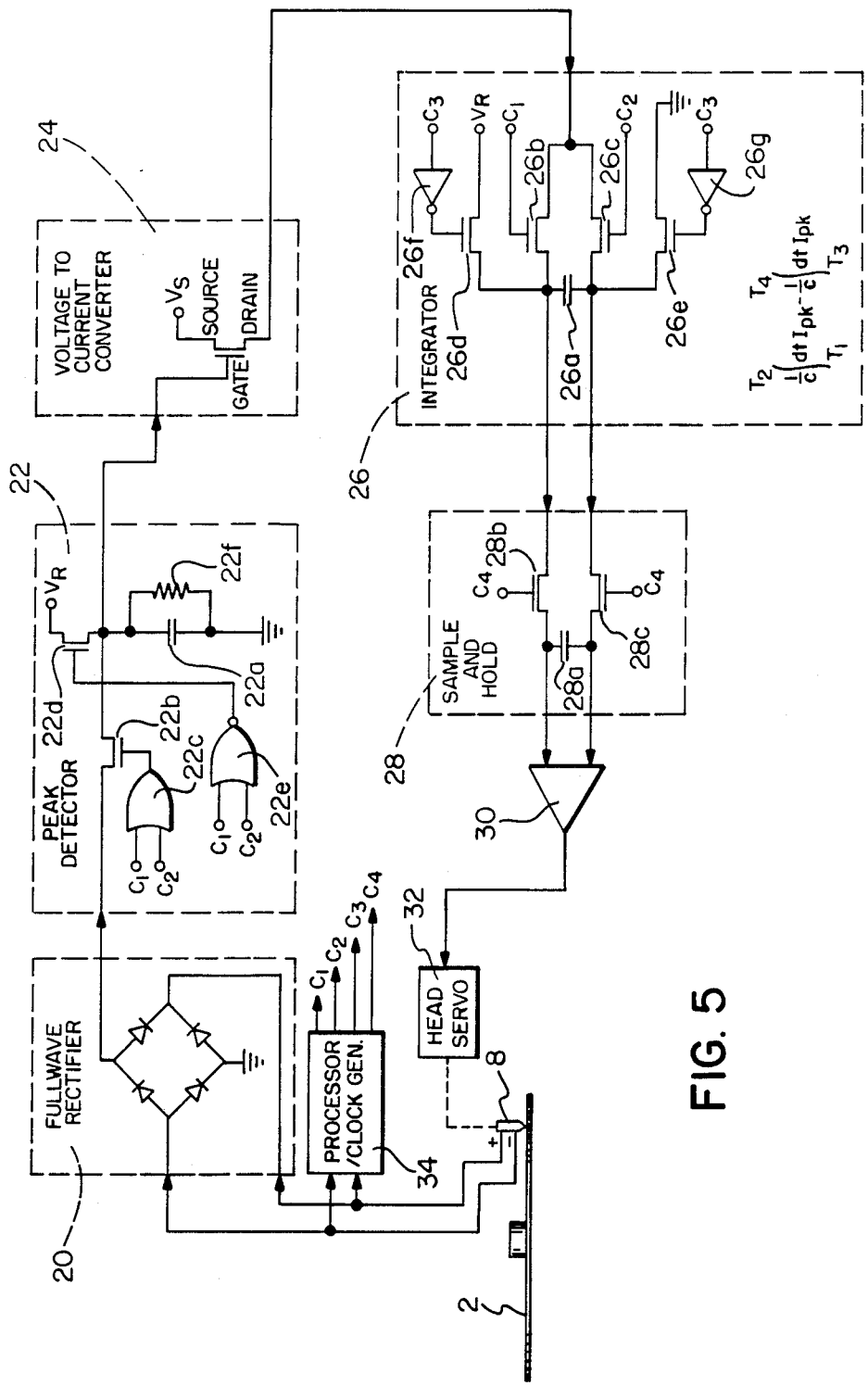
FIG. 5 is a simplified schematic diagram illustrating apparatus embodying the invention.

Apparatus embodying the invention is illustrated in FIG. 5. The positive and negative outputs of the read/write head 8 are applied to a full-wave rectifier 20. The output of the full-wave rectifier 20 is applied to a peak detector 22. The odd and even tracking bursts (illustrated in FIG. 6a) are full-wave rectified in the rectifier 20 whose output (illustrated in FIG. 6b) is transformed into a series of peaks by the peak detector 22 (illustrated in FIG. 6c). The peak detector 22 operates in synchronism with clock signals $C_1$ and $C_2$ (FIG.'s 6f and 6g, respectively) to perform peak detection only when the head 8 traverses the sector interface regions 12 (thus excluding user data recorded within the various sectors 6).

A voltage-to-current converter 24 converts the peak detector output voltage of FIG. 6c to a current and applies it to the input of an integrator 26.

The integrator 26 integrates the odd tracking burst peaks occurring from time $T_1$ until time $T_2$ and integrates the even tracking burst peaks occurring from time $T_3$ to time $T_4$ of FIG. 6 and subtracts the two integrals from one another. (FIG. 6d illustrates the output of the integrator 26 as a function of time.) Shortly after time $T_4$, the integrator 26 has concluded its task, and a sample-and-hold circuit 28 takes a snapshot or quick sample of the integrator output, holds it and applies it through an amplifier 30 to a head servo 32. The sample-and-hold circuit output (FIG. 6e) constitutes the head tracking position error signal used by the head servo 32 to correct the head position. The servo 32 adjusts the position of the head 8 so as to minimize the error signal. The error signal is updated when the head 8 scans the next interface region 12 between adjacent sectors 6, at which time the foregoing process is repeated. In the embodiment of FIG. 1, all of this happens 78 times for each revolution of the disk 2.

Description of the Operation of the Circuit of FIG. 5

A processor/clock generator 34 uses prerecorded sync data picked up by the head 8 to synchronize operation of the circuit of FIG. 5. The processor 34 generates the clock signals $C_1$, $C_2$, $C_3$, $C_4$ of FIGS. 6f, g, h and i, respectively

Peak Detector

The peak detector 22 includes a peak detecting capacitor 22a. A gating switch 22b gates the output of the rectifier 20 (FIG. 6b) to the peak detector capacitor 22a so as to charge the capacitor 22a only during the time intervals between times $T_1$ and $T_2$ and between times $T_3$ and $T_4$ (i.e., when the odd and even tracking bursts occur). The clock signals $C_1$ and $C_2$ control the gating switch 22b through a NOR gate 22c. The clock signals $C_1$ and $C_2$ also control a reset switch 22d through a NOR gate 22e. The reset switch 22d resets the peak detector capacitor 22a to a given voltage (e.g., $V_R$) prior to the time intervals of each of the odd and even tracking bursts.

The capacitance of the capacitor 22a is chosen so that the rise time of the capacitor voltage (FIG. 6c) is not slower than the rise time of any individual tracking burst peak. The resistance of a discharge resistor 22f (connected across the capacitor 22a) is chosen so that the capacitor 22a discharges between individual tracking burst peaks by an amount which exceeds the highest expected deviation between individual tracking burst peak voltages. Typically, the resistance of the resistor 22f should be such that the voltage on the capacitor 22a discharges by about 15% between individual tracking burst peaks, as illustrated in FIG. 6c. By choosing the capacitive and resistive values of the components of the peak detector 22 in the foregoing manner, the voltage across the capacitor 22a will accurately reflect the magnitude of each of the servo bursts peaks as they occur.

Integrator

Whenever the head 8 is in one of the main track numbers 1, 3, 5 . . . , the odd tracking burst output from the voltage-to-current converter 24 charges one side of an integrator capacitor 26a through a switch 26b operated in synchronism with the clock signal $C_1$. The even tracking burst output of the voltage-to-current converter 24 charges the other side of the capacitor 26a through a switch 26c operated in synchronism with the clock signal $C_2$. (Whenever the head 8 is in one of the main track numbers 2, 4, 6 . . . , the roles of the odd and even bursts are reversed.) The voltage across the integrating capacitor 26a is reset whenever the head 8 is not overlying one of the sector interface regions 12, as follows: The one side of the capacitor 26a is set to one voltage (e.g. $V_R$) through a switch 26d while the other side of the capacitor 26a is set to ground potential through a switch 26e. The switches 26d and 26e are controlled by the clock signal $C_3$ (FIG. 6h) through inverters 26f and 26g, respectively.

As illustrated in FIG. 6d, the voltage across the integrating capacitor 26a increases from time $T_1$ to time $T_2$ as the (odd burst) current $I_{peak}$ from the converter 24 charges the one side of the capacitor 26a. Then, from time $T_3$ to time $T_4$, the capacitor voltage decreases as the (even burst) current from the converter 24 charges the other side of the capacitor 26a. Whatever voltage remains on the capacitor 26a at time $T_4$ constitutes the difference between the two integrals:

$$\frac{1}{c} \int_{T_1}^{T_2} dt\, I_{peak} - \frac{1}{c} \int_{T_3}^{T_4} dt\, I_{peak}$$

where c represents the capacitance of the integrating capacitor 26a.

Sample and Hold

The sample-and-hold circuit 28 includes a sample-and-hold capacitor 28a. The voltage across the integrating capacitor 26a is quickly sampled shortly after time $T_4$ by the sample-and-hold capacitor 28a through switches 28b, 28c in synchronism with the clock signal $C_4$ (FIG. 6i). Thus, the output of the sample-and-hold circuit 28 always reflects the latest position error computed by the integrator 26. As illustrated in FIG. 6e, the output of the sample and hold circuit 28 is updated each time the head traverses the next sector interface region 12 in synchronism with the clock signal $C_4$.

The voltage across the sample-and-hold capacitor 28a is applied through an amplifier 30 to the head servo 32 as a calibrated head position error feedback signal. The head servo 32 employs this signal in a well known manner to maintain the center of the head 8 over the center line of the desired main track. Thus, referring to FIG. 1c, if the position of the head 8 corresponds to the off-center dashed line position of FIG. 1c, the head servo would receive a corresponding error signal and move the head toward the solid line position illustrated in FIG. 1c.

The Technical Advance

By prerecording the odd and even tracking bursts sequentially in each of the sector interface regions, and by first peak detecting and then integrating the servo burst picked up by the read/write head, the invention solves significant problems plaguing the prior art. First, sequentially arranging the odd and even tracking bursts for a given track eliminates any requirement for simultaneously processing the two tracking bursts in parallel channels, thus eliminating possibility of introducing the offset error between the two channels into the system. The invention includes a single peak detector and a single integrator for processing both the odd and even tracking bursts. Thus, a single channel suffices.

Secondly, performing peak detection prior to the integration process produces a head tracking position error signal predominantly dependent only upon the difference in peak average amplitude of each tracking burst pair. This contrasts with the widely used technique of calculating position error directly from the rectified servo burst, which technique is heavily dependent upon the tracking burst waveform as sensed by the head. As mentioned above, this waveform changes significantly as a function of track radius, thus introducing a significant radial bias. The apparatus of the present invention virtually eliminates any dependency upon tracking burst waveform, so that the tracking error signal is virtually free of radial bias. As a measure of the significance of this advantage, an experiment was performed comparing the method of directly integrating the servo burst with the method of this invention of integrating only the servo burst peaks, for several disk tracks of widely varying radii. The results are summarized in the table below. The data column representing the integral of the burst peaks was obtained using digital processing techniques, which were simulated on a computer.

| Track Radius [in.] | Integral of Odd & Even Servo Bursts° (No Peak Det.) | % Error | Integral of Odd & Even Burst Peaks° | % Error |
|---|---|---|---|---|
| 2.298 | 15.39 | 0 | 38.51 | 0 |
| 1.998 | 16.91 | +9.8 | 38.02 | −1.3 |
| 1.698 | 18.50 | +20.2 | 37.64 | −2.0 |
| 1.398 | 20.13 | +30.8 | 37.28 | −3.2 |

°[VOLT-SEC × $10^{-6}$]

The table shows that the invention reduces the radial bias error by nearly a factor of ten (from a maximum of about 30% to a maximum of about only 3%).

While FIG. 5 illustrates an analog circuit embodying the invention, a skilled worker may readily implement the circuit of FIG. 5 as a digital circuit, using digital signal processing techniques well-known in the art to perform the peak detection and integration functions performed by the analog circuit of FIG. 5 without departing from the spirit and scope of the invention. Furthermore, while each of the switches 22b, 22d, 26b, 26c, 26d, 26e, 28b and 28c and the voltage-to-current converter 24 are each depicted (for the sake of simplicity) in FIG. 5 as a metal oxide semi-conductor transistor characterized by a gate controlling current flow between a source and a drain, they may each comprise, instead, a bipolar transistor characterized by a base controlling current flow between an emitter and a collector, or an equivalent circuit.

While the invention has been described in detail with particular reference to preferred embodiments thereof, it is understood that variations and modifications may be effected within the spirit and scope of the invention.

What is claimed is:

1. A disk drive system adapted to receive a removable disk characterized by a plurality of arcuate tracks and by a plurality of odd and even tracking signal burst pairs recorded at periodic intervals adjacent opposite sides of each of said tracks in serial succession, said disk drive system comprising:

a read/write head positionable over a selected track on said disk;

means for rectifying the response of said head to said odd and even tracking bursts associaed with said selected track;

means for peak detecting the output of said rectifying means so as to generate odd and even burst peaks in said serial sequence;

means for producing the difference between the integral of said odd burst peaks and the integral of said even burst peaks;

means for changing the position of said head by an amount proportional to said difference so as to reduce said difference, whereby said odd and even tracking bursts are processed in a single channel comprising said peak detector means and said integrating means, and whereby said difference is at least nearly independent of the waveform of said tracking burst and of the radial position of said selected track;

wherein said integrating means comprise an analog circuit, said analog circuit comprising:

an integrating capacitor;

means for connecting one side of said capacitor to the output of said peak detecting means during the occurrence of an odd burst and for connecting the opposite side of said capacitor to the output of said peak detecting means during the occurrence of an even burst; and means for resetting the voltage across said capacitor at a time prior to the occurrence of each said odd and even burst pairs.

2. The disk drive system of claim 1 wherein said peak detecting means comprises an analog circuit, said circuit comprising:

a capacitor;

means synchronized with the occurrence of each of said odd and even tracking bursts to apply said head response to said capacitor;

means for resetting the voltage across said capacitor prior to the occurrence of said odd and even bursts; and means for partially discharging said capacitor between successive ones of said burst peaks.

3. The disk driver system of claim 1 further comprising a voltage-to-current converter connected between the output of said peak detecting means and the input of said integrating means, whereby the output voltage of said peak detector means is converted to a current to charge said integrating capacitor.

4. The disk drive system of claim 2, wherein said peak detecting capacitor and said discharging means are characterized by capacitance and resistance values, respectively, wherein said capacitance and resistance values are selected so that the rise time of the voltage on said peak detecting capacitor is faster than the rise time of an individual one of said burst peaks and wherein said capacitor is discharged between successive ones of said burst peaks by an amount exceeding the maximum expected voltage deviation between successive ones of said peaks.

5. The disk drive system of claim 1 further comprising a sample-and-hold circuit connected between the output of said integrating means and the input of said head position changing means, said sample and hold circuit comprising:

a sample-and-hold capacitor having two sides connected across the input of said head position changing means; and means for connecting the two sides of said sample-and-hold capacitor to the respective sides of said integrating capacitor for a brief time following the occurrence of each pair of said odd and even bursts.

6. A data storage system, comprising:

a floppy disk characterized by a magnetic media, said disk being divided into a plurality of sectors in which user data may be recorded, adjacent ones of said sectors being separated by sector interface regions, said disk being further characterized by a plurality of arcuate tracks extending through said sectors and interface regions;

a head positionable over a selected one of said disk tracks;

a plurality of odd tracking bursts prerecorded in a first position of each of said sector interface regions adjacent sides of said tracks, a plurality of odd and even tracking bursts prerecorded in a second portion of each of said interface regions adjacent opposite sides of said tracks, whereby said odd and even servo bursts are placed in serial succession along the length of each of said tracks;

means for rectifying the response of said head to said odd and even bursts;

means for peak detecting the output of said rectifying means so as to generate odd and even burst peaks in serial sequence;

means for producing the difference between the integral of said odd burst peaks and the integral of said even burst peaks;

means for changing the radial position of said head with respect to said selected track by an amount proportional to said difference, whereby said odd and even bursts are processed in a single channel comprising said peak detection means and said integration means, and whereby said difference is at least nearly independent of the waveform of said bursts and virtually unaffected by the radial position of said selected track;

wherein said difference producing means comprises an analog circuit, said analog circuit comprising:

an integrating capacitor;

means for connecting one side of said capacitor to the output of said peak detecting means during the occurrence of an odd burst and for connecting the opposite side of said capacitor to the output of said peak detecting means during the occurrence of an even one of said bursts;

means for resetting the voltage across said capacitor at a time prior to the occurrence of a pair of said odd and even bursts.

7. The disk drive system of claim 6 wherein said peak detecting means comprises an analog circuit, said circuit comprising:

a capacitor;

means synchronized with the occurrence of each said odd and even tracking bursts to apply said head response to said capacitor;

means for resetting the voltage across said capacitor prior to the occurrence of said odd and even bursts; and means for partially discharging said capacitor between successive ones of said burst peaks.

8. The disk drive system of claim 6 further comprising a voltage-to-current converter connected between the output of said peak detecting means and the input of said difference means, whereby the output voltage of said peak detector means is converted to a current to charge and discharge said integrating capacitor.

9. The disk drive system of claim 7, wherein said peak detecting capacitor and said discharging means are characterized by capacitance and resistance values, respectively, wherein said capacitance and resistance values are selected so that the rise time of the voltage on said peak detecting capacitor is faster than the rise time of individual burst peaks and wherein said capacitor is discharged between successive ones of said burst peaks by an amount exceeding the maximum expected voltage deviation between successive ones of said peaks.

* * * * *